US007698644B2

(12) United States Patent
Hawk et al.

(10) Patent No.: US 7,698,644 B2
(45) Date of Patent: Apr. 13, 2010

(54) SYSTEM AND METHOD FOR DISPLAYING STICKY NOTES ON A PHONE

(75) Inventors: Doug Hawk, San Jose, CA (US); Cullen Jennings, San Jose, CA (US); Richard Tywoniak, Moss Beach, CA (US)

(73) Assignee: Cisco Technology, Inc., San Jose, CA (US)

( * ) Notice: Subject to any disclaimer, the term of this patent is extended or adjusted under 35 U.S.C. 154(b) by 478 days.

(21) Appl. No.: 11/114,445

(22) Filed: Apr. 26, 2005

(65) Prior Publication Data

US 2006/0239248 A1    Oct. 26, 2006

(51) Int. Cl.
*G06F 3/00* (2006.01)
(52) U.S. Cl. .......................... 715/715; 370/352
(58) Field of Classification Search ................ 715/764, 715/715, 512, 860, 238, 230; 370/352
See application file for complete search history.

(56) References Cited

U.S. PATENT DOCUMENTS

| | | | | |
|---|---|---|---|---|
| 5,526,424 A | * | 6/1996 | Karnowski | 379/355.05 |
| 5,664,013 A | * | 9/1997 | Rossi | 379/428.04 |
| 6,029,063 A | * | 2/2000 | Parvulescu et al. | 455/412.1 |
| 6,040,824 A | * | 3/2000 | Maekawa et al. | 345/173 |
| 6,272,532 B1 | * | 8/2001 | Feinleib | 709/206 |
| 6,360,101 B1 | * | 3/2002 | Irvin | 455/456.6 |
| 6,504,908 B1 | | 1/2003 | Bellomo et al. | |
| 6,542,586 B1 | * | 4/2003 | Helstab | 379/93.19 |
| 7,231,229 B1 | * | 6/2007 | Hawkins et al. | 455/564 |
| 2002/0065881 A1 | * | 5/2002 | Mansikkaniemi et al. | 709/204 |
| 2003/0206201 A1 | * | 11/2003 | Ly | 345/835 |
| 2003/0210260 A1 | * | 11/2003 | Palmer et al. | 345/715 |
| 2004/0070633 A1 | * | 4/2004 | Nakamura et al. | 345/860 |
| 2004/0095394 A1 | * | 5/2004 | Fox et al. | 345/800 |
| 2005/0091578 A1 | | 4/2005 | Madan et al. | |
| 2005/0183005 A1 | * | 8/2005 | Denoue et al. | 715/512 |
| 2005/0223315 A1 | * | 10/2005 | Shimizu et al. | 715/512 |
| 2006/0063539 A1 | * | 3/2006 | Beyer, Jr. | 455/456.3 |
| 2006/0064337 A1 | * | 3/2006 | Naberhuis et al. | 705/8 |
| 2006/0095859 A1 | * | 5/2006 | Bocking et al. | 715/764 |
| 2007/0083806 A1 | * | 4/2007 | Boyles et al. | 715/512 |
| 2007/0118794 A1 | * | 5/2007 | Hollander et al. | 715/512 |

OTHER PUBLICATIONS

Electric Pocket Launches BugMe! Notepad for Palm Powered Handhelds, Business Wire, Apr. 6, 2004.*

* cited by examiner

*Primary Examiner*—William L Bashore
*Assistant Examiner*—Meseker Takele
(74) *Attorney, Agent, or Firm*—Trellis IP Law Group, PC

(57) ABSTRACT

A system and method for displaying sticky notes on a phone are provided. The system for displaying sticky notes on a phone includes a processing system and a controller. The processing system includes a processor that is coupled to a display icon and user input device, to enter and display the sticky notes on the phone. The controller classifies the entered sticky notes on the basis of the action to be performed on them. These sticky notes may be classified, based on user identification associated with a multi-user phone.

26 Claims, 5 Drawing Sheets

SYSTEM AND METHOD FOR DISPLAYING STICKY NOTES ON A PHONE

BACKGROUND OF THE INVENTION

1. Field of Invention

Embodiments of the invention relate in general to sticky notes, and more specifically, the embodiments of the invention relates to systems and methods for displaying the sticky notes on a phone.

2. Description of the Background Art

PC or phone users generally use sticky post-it notes to store information related to tasks they need to perform, for example, these are used by users for the following: to remind them about people they need to call, things they have to do, appointments they need to attend, and to jot down messages. However, the sticky post-it notes are generally difficult to handle. They can get lost or stick to clothes. To overcome these problems, newer ways of recording, keeping and managing important information, dates, phone numbers and events, using electronic sticky notes and reminders, have been developed. A few computer software programs provide sticky notes, for example, sticky notes on MacOSX or 3M's product on windows. These electronic sticky notes are generally multi-functional, and their appearance can be customized; their fonts, colors and buttons changed, and styles saved. Further, they can be hidden for a certain period, until a specified date and time; or displayed every day, week or month, to act as reminders.

However, these electronic sticky notes cannot be applied on a phone.

DETAILED DESCRIPTION OF EMBODIMENTS OF THE INVENTION

The embodiments of the invention provide a method, a system, and a computer program product for displaying sticky notes on a phone. The sticky notes can be entered by a user and subsequently accessed via a user interface. In various embodiments of the invention, the sticky notes can be classified into various categories, based on, for example, the action to be performed on the sticky notes. Further, they can be differentiated, based on different colors for different notes. In various embodiments of the invention, sticky notes can store phone numbers. The user interface can send an alarm to the user if a phone call is received from the stored number. In an embodiment of the invention, conference calls can also be set up by using the phone numbers stored in the sticky notes.

Figure 1:
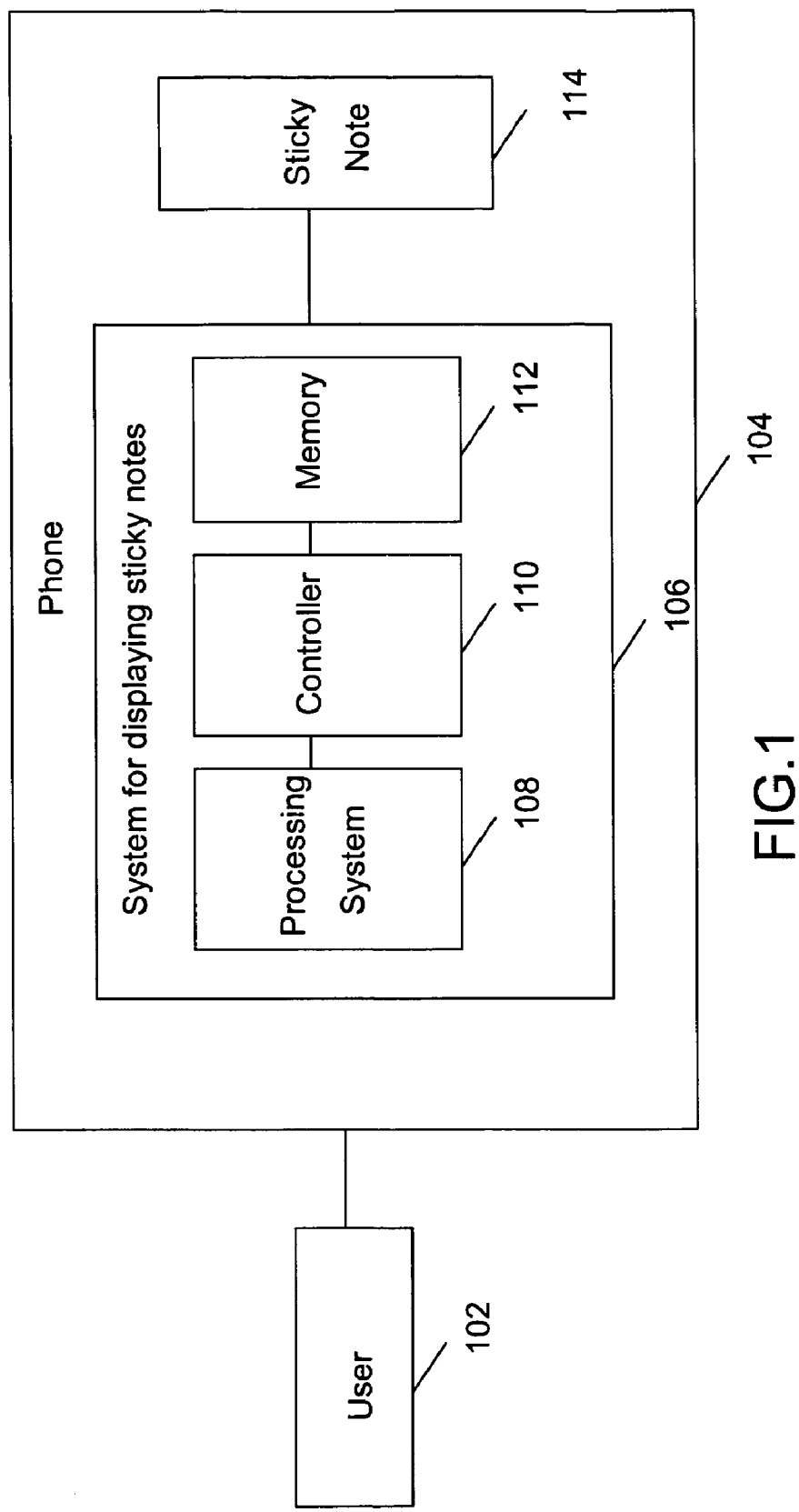
FIG. 1 illustrates an environment in which a system for displaying sticky notes is envisioned to operate, in accordance with an exemplary embodiment of the invention.

FIG. 1 illustrates an environment in which a system for displaying sticky notes on a phone is envisioned to operate, according to an exemplary embodiment of the present invention. As depicted in FIG. 1, a user 102 logs on to a phone 104. Phone 104 may be a single-user phone or a multi-user phone. In an embodiment of the invention, the user can log in through a password or key assigned to him. User 102 can enter sticky notes in phone 104. A system for displaying sticky notes 106 displays a sticky note 114 that corresponds to user 102 on phone 104. Sticky note 114 (hereinafter referred to as sticky notes) may include information such as messages, to-do-lists, phone numbers, and tasks to be performed and appointments to attend. In an embodiment of the invention, in the case of multi-user phones, sticky notes corresponding to a user can be displayed once the user logs in. System for displaying sticky notes 106 includes a processing system 108 for entering and displaying the sticky notes on phone 104, a controller 110 for classifying the entered sticky notes, and a memory 112 for storing them.

Figure 2:
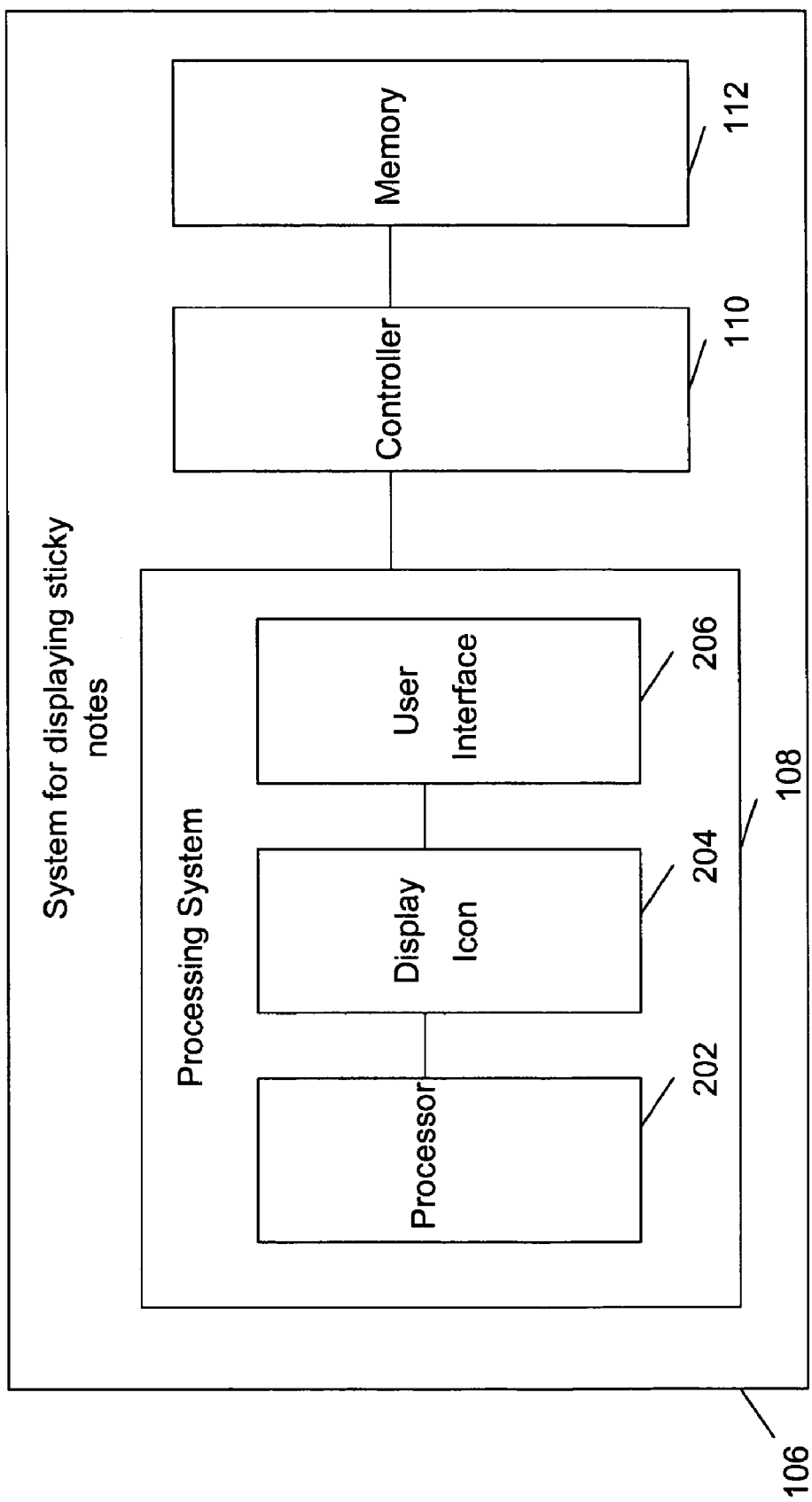
FIG. 2 illustrates a system for displaying sticky notes on a phone, in accordance with an exemplary embodiment of the invention.

As depicted in FIG. 2, processing system 108 includes a processor 202 that is coupled to a display icon 204 and a user interface 206. Display icon 204 displays the sticky notes on phone 104. In various embodiments of the invention, user interface 206 may be a web interface or program on a user's computer, Personal Information Manager (PIM) notes system, or a device to directly log on to phone 104. User interface can be used to receive the sticky notes from a user. In an embodiment of the invention, user interface 206 includes a touch screen for placing the sticky notes in stacks and moving them around the screen. In an embodiment of the invention, user 102 can enter sticky notes through a set of buttons assigned in phone 104, for example, user 102 could select sticky notes using a touch screen or other phone button, then edit the sticky note using the phone keypad for letters as well as numbers. The same process could be used for creating new sticky notes as well. In another embodiment of the invention, user interface 206 further includes soft keys for moving and organizing the sticky notes, based on user-defined priority. For example, user interface 206 can allow user 102 to create a category or classification of sticky notes and then map that classification to a specific color. Sticky notes may then be mapped to a category or classification when they are created or at a later time. Thus, user 102 can easily visually recognize all sticky notes related to a specific topic or category and user 102 can also easily search for all related sticky notes. The soft key can include a key, which, if clicked on, can hide all the sticky notes. In an embodiment of the invention, display icon 204 can be a part of user interface 206. In another embodiment of the invention, the sticky notes corresponding to the logged user can be displayed by clicking on a button corresponding to display icon 204. In various embodiments of the invention, user interface 206 can be a software module. In yet another embodiment of the invention, user interface 206 can be a graphical user interface.

Controller 110 classifies the sticky notes on the basis of the action to be performed on them. For example, the action to be performed may be to keep track of people whom users need to call, task users need to perform, etc. In an embodiment of the invention, controller 110 can also classify the sticky notes on the basis of user identification associated with phone 104. For example, phone 104 may access a corporate or personal directory or a personal address book and automatically map a name from the sticky notes to a phone number, project or other classifications to automatically assist in classification and organization of the sticky notes on phone 104. In various embodiments of the invention, controller 110 can use a color scheme to classify the sticky notes, i.e., different colors may be assigned to sticky notes, based on the action to be performed. User interface 206 subsequently displays the classified sticky notes based on the color scheme. In an embodiment of the invention, different colors may signify different user identification. In an embodiment of the invention, controller 110 includes a time alarm module, for receiving a defined time period after which the sticky notes are displayed. In further embodiments, controller 110 can assign a defined duration of time for which the sticky notes can be stored. After completion of this defined time duration, the sticky notes can be automatically destroyed. In an embodiment of the invention, sticky notes can be displayed according to their order of priority, i.e., the sticky note for which an alarm is to be sounded first can be at the top of the stack. In various embodiments of the invention, controller 110 can be implemented in the form of a software module.

System for displaying sticky notes 106 also includes a memory 112, which can include hard disk variants, floppy/compact disk variants, digital versatile disk (DVD) variants, smart cards, partially or fully-hardened removable media, read only memory, random access memory, cache memory, and so on, in accordance with the requirements of a particular application. Memory 112 can be used to store sticky notes entered by user 102.

In an embodiment of the invention, system for displaying sticky notes 106 includes a call button to launch a call to a phone number. In another embodiment of the invention, system for displaying sticky notes 106 further includes a call button that allows a conference call to be set up with at least one phone number stored in the sticky notes. For example, a sticky note can contain more that one contact or phone number. Touching these numbers sequentially can initiate a phone conference between the numbers referenced on the sticky note.

According to an embodiment of the present invention, the sticky note can also act as a phone reminder and can contain the name or number of phone calls. Whenever a call is received from the phone number stored in the sticky notes, this number or name can be popped to the top of the stack, and is displayed.

Figure 3:
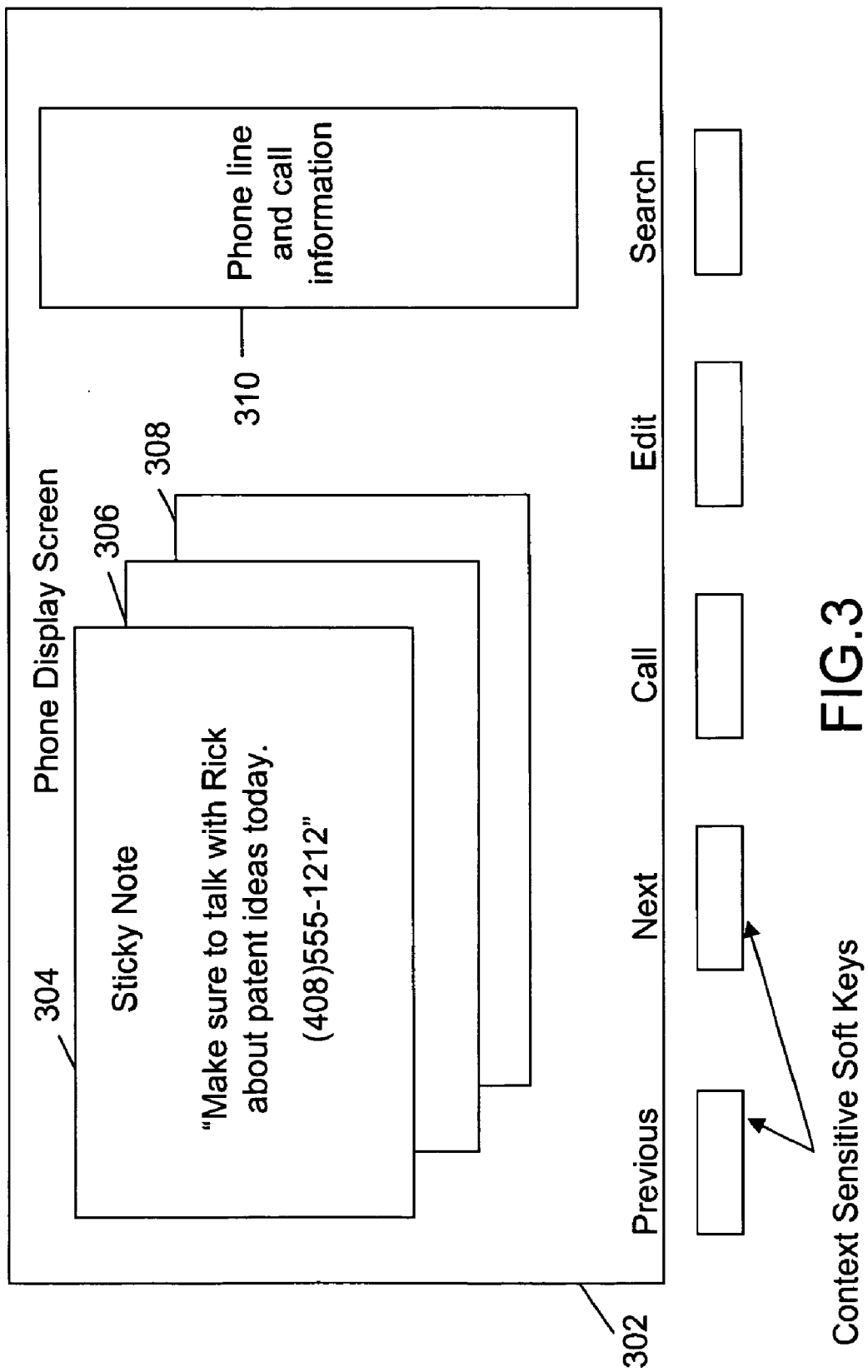
FIG. 3 illustrates an exemplary user interface for displaying sticky notes on a phone, in accordance with an exemplary embodiment of the invention.

FIG. 3 illustrates a user interface with sticky notes, in accordance with an exemplary embodiment of the invention. As depicted in FIG. 3, a user interface 302 includes exemplary sticky notes 304, 306, and 308, and a phone line and call information module 310. Sticky note 304 shows an exemplary text and an exemplary phone number. In an embodiment of the invention, user interface 302 is not touch sensitive. Therefore, context sensitive keys are provided on the phone. Exemplary context sensitive keys include a key for going to a previous or next sticky note, a key for making a call to a desired number, a key for editing the desired text, and a key for searching the stored sticky notes and the stored phone numbers. The exemplary context sensitive keys are physical keys whose labels and functions change based on the mode of the phone. Thus, when user 102 is viewing or editing sticky notes 304, 306 and 308, one of the context specific keys can become a call button. Phone line and call information module 310 includes a means for making and reviewing calls. In various embodiments of the invention, there can be sticky notes that do not include phone numbers. The sticky notes can include other information, for example, task lists, grocery lists, or other reminders. System for displaying sticky notes 106 can recognize the format of phone numbers and only display the call button, where it recognizes a valid phone number.

Figure 4:
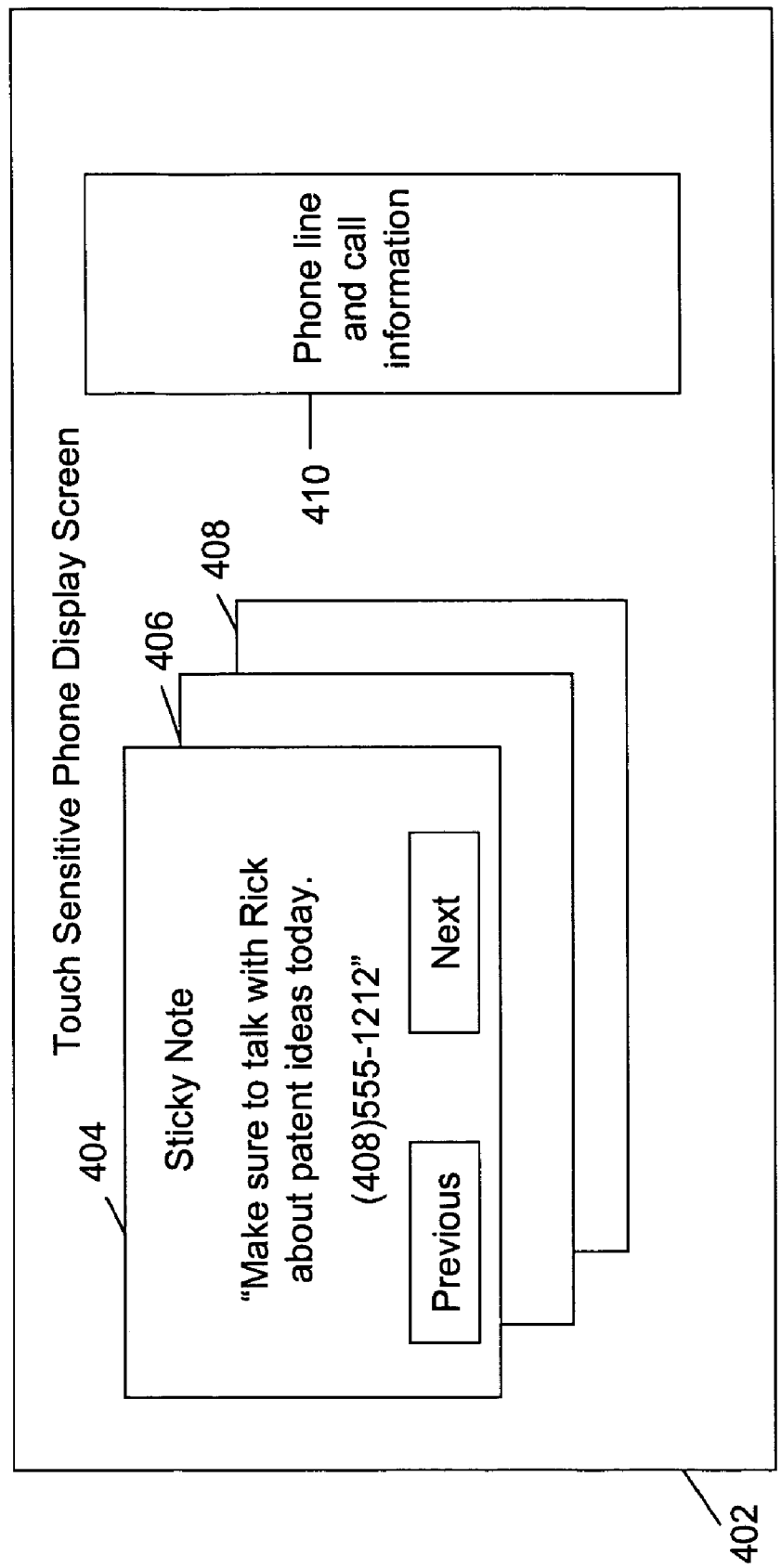
FIG. 4 illustrates an alternate user interface for displaying sticky notes on a phone, in accordance with an exemplary embodiment of the invention.

FIG. 4 illustrates a touch sensitive user interface with sticky notes, in accordance with an exemplary embodiment of the invention. As depicted in FIG. 4, a user interface 402 includes sticky notes 404, 406, and 408, and a phone line and call information module 410. Sticky note 404 shows an exemplary text message and an exemplary phone number. User 102 can directly touch the exemplary phone number to initiate a call to that number. Further, user 102 can directly touch the exemplary text message to edit it. In an embodiment of the invention, user 102 can select and bring sticky notes 406 and 408 to the front. This can be done by directly touching sticky notes 406 and 408. Phone line and call information module 410 includes a means for making and reviewing calls.

In another embodiment of the invention, system for displaying sticky notes 106 further includes a call button that allows a conference call to be set up with at least one phone number stored in the sticky notes. For example a sticky note could contain more that one contact or phone number. Touching these numbers sequentially can initiate a phone conference between the numbers referenced on the sticky note.

According to an embodiment of the present invention, the sticky note can also act as a phone reminder and can contain the name or number of phone calls. Whenever a call is received from the phone number stored in the sticky notes, this number or name can be popped to the top of the stack, and is displayed.

Figure 5:
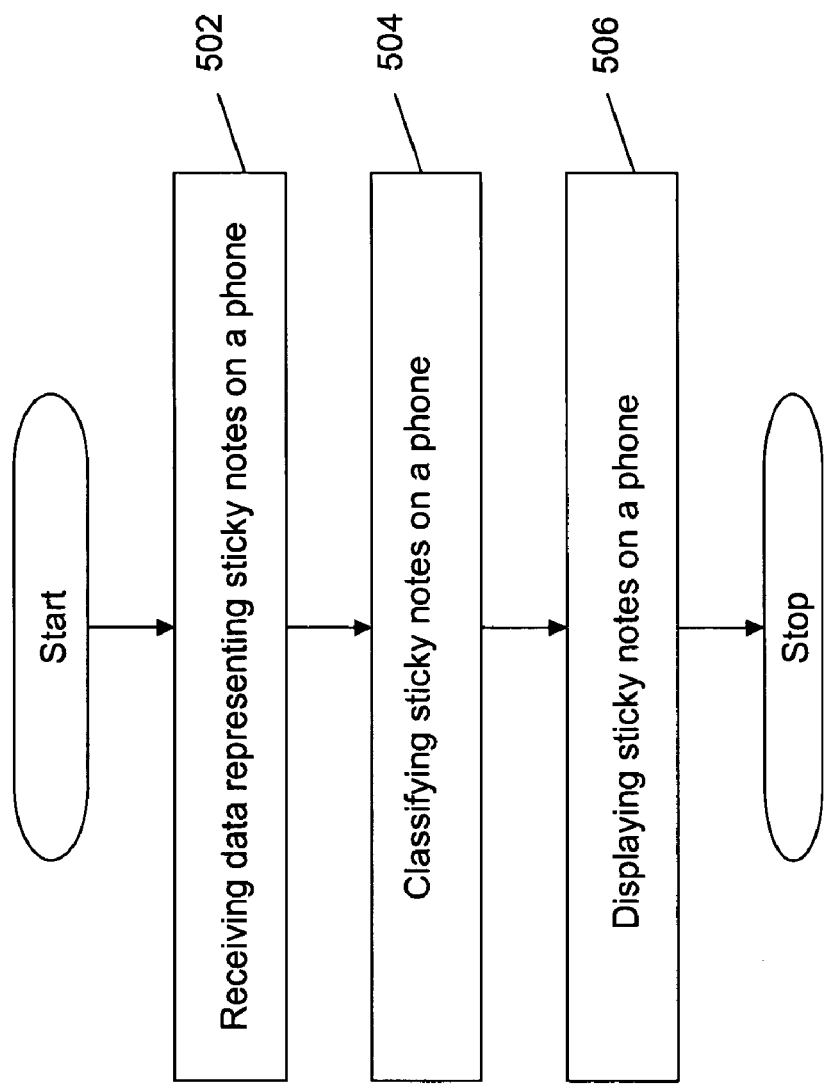
FIG. 5 illustrates a method for displaying sticky notes on a phone, in accordance with an exemplary embodiment of the invention.

FIG. 5 is a flow chart illustrating a method for displaying the sticky notes on phone 104, according to an embodiment of the invention. At step 502, data representing sticky notes is received on phone 104 via processing system 202. In various embodiments of the invention, the received sticky notes are stored in memory device 112. At step 504, controller 110 classifies the sticky notes received at step 502 on the basis of the predefined action to be performed on them. Exemplary actions that can be performed have been described earlier in conjunction with FIG. 1. At step 506, display icon 206 displays the sticky notes on phone 104 whenever the user logs on to phone 104. In various embodiments of the invention, the display of sticky notes can be based on the classification performed at step 504.

Embodiments of the present invention have the advantage that users can enter and display virtual sticky notes on their phones. They can classify the sticky notes on the basis of the predefined action to be performed on them. Users can assign a fixed time period, after which the sticky notes are displayed, and a fixed time period during which the sticky notes are stored. Sticky notes can also be used as reminders and for setting up conference calls. Sticky notes, entered in accordance with various embodiments of the present invention, do not get lost or stuck to clothes, and therefore result in users becoming more organized.

Although the invention has been discussed with respect to specific embodiments thereof, these embodiments are merely illustrative, and not restrictive, of the invention. For example, a 'method for displaying sticky notes' can include any type of analysis, manual or automatic, to anticipate the needs of entering and displaying sticky notes on a phone.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer-readable medium' for purposes of embodiments of the present invention may be any medium that can contain and store the computer program for use by or in connection with the instruction execution system apparatus, system or device. The computer-readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system for displaying sticky notes on a phone, the system comprising:
   a user interface configured to receive a messages for a plurality of sticky notes on the phone and configured to display the plurality of sticky notes, each of the plurality of sticky notes including a message, at least one of the sticky notes displaying a phone number in the message on the sticky note, wherein not all of the messages for the plurality of sticky notes include a phone number; and
   a controller of the phone configured to:
   receive data representing the plurality of sticky notes, the data including a phone number for a sticky note if the message includes a phone number, wherein the controller assigns a defined time period for which the sticky notes are stored;
   display the plurality of sticky notes in a stack wherein the plurality of sticky notes are displayed in an order where a sticky note above another sticky note covers at least a part of the another sticky note;
   allow displaying of different sticky notes in the plurality of sticky notes in the stack by changing the order of the sticky notes in the stack;
   determine when the at least one sticky note with the message with the phone number becomes visible from below another sticky note in the stack of the plurality of sticky notes by the changing of the order of the stack of the plurality of sticky notes such that the at least one sticky note is in a front position above the another sticky note;
   analyze data of the at least one sticky note to determine if a valid phone number is being displayed on the at least one sticky note based on recognizing a valid format of a phone number in the message;
   recognize digits of the phone number from the message on the at least one sticky note;
   automatically reconfigure a call button for the phone from a first non-call button function to a second call button function to cause a phone call to be made if selected in response to recognizing the valid phone number being displayed on the at least one sticky note, the call button associated with the digits of the phone number recognized on the at least one sticky note, wherein the call button is not configured to cause the phone call when of the another sticky note that does not include the phone number is visible and in the front position above the at least one sticky note;
   receive a phone call request from an input of the call button;
   determine the digits of the phone number that were recognized; and
   cause a phone call to be made using the digits of the phone number that were recognized.

2. The system of claim 1, wherein the user interface comprises a display icon for displaying the sticky note.

3. The system of claim 1, wherein the user interface is configured to log based on user identification.

4. The system of claim 1, wherein the user interface displays a classified sticky note by using a color scheme.

5. The system of claim 1, wherein the controller is configured to assign a predefined time period after which the sticky note are displayed.

6. The system of claim 1, wherein the phone comprises a multi-user phone.

7. The system of claim 6, wherein the controller classifies the sticky note based on user identification associated with the multi-user phone.

8. The system of claim 1, wherein the user interface comprises a touch screen.

9. The system of claim 1, wherein the call button comprises soft keys for moving the sticky note in a stack based on user-defined priority.

10. The system of claim 1, wherein the system further comprises a context sensitive call button or a touch sensitive call button to call to the recognized phone number, wherein a function associated with the context sensitive call button or touch sensitive call button is reconfigured to cause the phone call to be made upon selection.

11. The system of claim 10, wherein the system further comprises a means for creating a conference call with the recognized phone number, wherein the controller is configured to create the conference call with the recognized phone number.

12. The system of claim 10, wherein the controller is configured to display the sticky note that includes the recognized phone number upon receiving a call from the recognized phone number.

13. The method of claim 1, wherein the plurality of sticky notes in the stack comprise three or more sticky notes, wherein the order of the three or more sticky notes in the stack are changed.

14. A method for displaying sticky notes on a phone, the method comprising:
   receiving data representing the plurality of sticky notes, each of the plurality of sticky notes including a message, at least one of the sticky notes displaying a phone number in the message on the sticky note, wherein not all of the messages for the plurality of sticky notes include a phone number, wherein a defined time period is assigned for which the sticky notes are stored;
   displaying the plurality of sticky notes in a stack wherein the plurality of sticky notes are displayed in an order where a sticky note above another sticky note covers at least a part of the another sticky note;
   allowing displaying of different sticky notes in the plurality of sticky notes in the stack by changing the order of the sticky notes in the stack;
   determining when the at least one sticky note with the message with the phone number becomes visible from below another sticky note in the stack of the plurality of sticky notes by the changing of the order of the stack of the plurality of sticky notes such that the at least one sticky note is in a front position above the another sticky note;
   analyzing data of the at least one sticky note to determine if a valid phone number is being displayed on the at least one sticky note based on recognizing a valid format of a phone number in the message;
   recognizing digits of the phone number from the message on the at least one sticky note;
   automatically reconfiguring a call button for the phone from a first non-call button function to a second call button function to cause a phone call to be made if selected in response to recognizing the valid phone number being displayed on the at least one sticky note, the call button associated with the digits of the phone number recognized on the at least one sticky note, wherein the call button is not configured to cause the phone call when of the another sticky note that does not include the phone number is visible and in the front position above the at least one sticky note;
   receiving a phone call request from an input of the call button;
   determining the digits of the phone number that were recognized; and causing a phone call to be made using the digits of the phone number that were recognized.

15. The method of claim 14, wherein a classified sticky note is displayed by using a color scheme.

16. The method of claim 14, wherein the sticky notes are displayed after a predefined time period.

17. The method of claim 14, wherein the phone comprises a multi-user phone.

18. The method of claim 17, wherein the sticky note is classified based on user identification associated with the multi-user phone.

19. The method of claim 14, wherein the sticky note comprises a plurality of phone numbers that are recognized.

20. The method of claim 19, further comprising creating a conference call with a portion of the plurality of recognized phone numbers.

21. The method of claim 19, further comprising displaying the sticky note that includes the recognized phone number upon receiving a call from the recognized phone number.

22. The method of claim 14, further comprising setting up a call to the recognized phone number upon receiving the input for the phone call request.

23. The method of claim 14, wherein the designated call button comprises a context sensitive call button, the method comprising:
configuring a function associated with the context sensitive call button to cause the phone call to be made in response to recognizing the valid phone number.

24. The method of claim 14, wherein the designated call button comprises a touch sensitive call button that is displayed on the sticky note, the method comprising:
configuring a function associated with the touch sensitive call button to cause the phone call to be made in response to recognizing the valid phone number;
receiving a touch input for the touch sensitive call button; and
causing the phone call to be made upon receiving the touch input.

25. An apparatus for displaying sticky notes on a phone, the apparatus comprising:
a processing system including a processor coupled to a display and user input device; and
a computer-readable storage medium including instructions executable by the processor, the storage medium comprising:
one or more instructions for receiving data representing the plurality of sticky notes, each of the plurality of sticky notes including a message, at least one of the sticky notes displaying a phone number in the message on the sticky note, wherein not all of the messages for the plurality of sticky notes include a phone number, wherein a defined time period is assigned for which the sticky notes are stored;
one or more instructions for displaying the plurality of sticky notes in a stack wherein the plurality of sticky notes are displayed in an order where a sticky note above another sticky note covers at least a part of the another sticky note;
one or more instructions for allowing displaying of different sticky notes in the plurality of sticky notes in the stack by changing the order of the sticky notes in the stack;
one or more instructions for determining when the at least one sticky note with the message with the phone number becomes visible from below another sticky note in the stack of the plurality of sticky notes by the changing of the order of the stack of the plurality of sticky notes such that the at least one sticky note is in a front position above the another sticky note;
one or more instructions for analyzing data of the at least one sticky note to determine if a valid phone number is being displayed on the at least one sticky note based on recognizing a valid format of a phone number in the message;
one or more instructions for recognizing digits of the phone number from the message on the at least one sticky note;
one or more instructions for automatically reconfiguring a call button for the phone from a first non-call button function to a second call button function to cause a phone call to be made if selected in response to recognizing the valid phone number being displayed on the at least one sticky note, the call button associated with the digits of the phone number recognized on the at least one sticky note, wherein the call button is not configured to cause the phone call when of the another sticky note that does not include the phone number is visible and in the front position above the at least one sticky note;
one or more instructions for receiving a phone call request from an input of the call button;
one or more instructions for determining the digits of the phone number that were recognized; and
one or more instructions for causing a phone call to be made using the digits of the phone number that were recognized.

26. A computer-readable storage medium including instructions executable by a processor, the storage medium comprising:
one or more instructions for receiving data representing the plurality of sticky notes, each of the plurality of sticky notes including a message, at least one of the sticky notes displaying a phone number in the message on the sticky note, wherein not all of the messages for the plurality of sticky notes include a phone number, wherein a defined time period is assigned for which the sticky notes are stored;
one or more instructions for displaying the plurality of sticky notes in a stack wherein the plurality of sticky notes are displayed in an order where a sticky note above another sticky note covers at least a part of the another sticky note;
one or more instructions for allowing displaying of different sticky notes in the plurality of sticky notes in the stack by changing the order of the sticky notes in the stack;
one or more instructions for determining when the at least one sticky note with the message with the phone number becomes visible from below another sticky note in the stack of the plurality of sticky notes by the changing of the order of the stack of the plurality of sticky notes such that the at least one sticky note is in a front position above the another sticky note;
one or more instructions for analyzing data of the at least one sticky note to determine if a valid phone number is being displayed on the at least one sticky note based on recognizing a valid format of a phone number in the message;
one or more instructions for recognizing digits of the phone number from the message on the at least one sticky note;
one or more instructions for automatically reconfiguring a call button for the phone from a first non-call button function to a second call button function to cause a phone call to be made if selected in response to recognizing the valid phone number being displayed on the at least one sticky note, the call button associated with the digits of the phone number recognized on the at least one sticky note, wherein the call button is not configured to cause the phone call when of the another sticky note that does not include the phone number is visible and in the front position above the at least one sticky note;

one or more instructions for receiving a phone call request from an input of the call button;

one or more instructions for determining the digits of the phone number that were recognized; and one or more instructions for causing a phone call to be made using the digits of the phone number that were recognized.

* * * * *